(12) United States Patent  
Funk et al.

(10) Patent No.: US 7,665,284 B1
(45) Date of Patent: Feb. 23, 2010

(54) BELT DRIVE FOR LAWN MOWERS (75) Inventors: Brian R. Funk, Lehigh, KS (US); Darrin S. Hiebert, Hesston, KS (US)

(73) Assignee: Excel Industries, Inc., Hesston, KS (US)

( * ) Notice: Subject to any disclaimer, the term of this patent is extended or adjusted under 35 U.S.C. 154(b) by 0 days.

(21) Appl. No.: 12/288,041

(22) Filed: Oct. 16, 2008

Related U.S. Application Data (60) Provisional application No. 60/999,084, filed on Oct. 16, 2007.

(51) Int. Cl.
*A01D 69/08* (2006.01)

(52) U.S. Cl. .......................................... 56/11.6; 474/62

(58) Field of Classification Search .................. 56/11.6, 56/11.4; 474/62, 85, 63, 61, 84, 87, 117, 474/133, 134, 135; 180/53.1
See application file for complete search history.

(56) References Cited

U.S. PATENT DOCUMENTS

| | | | | |
|---|---|---|---|---|
| 423,046 | A | * | 3/1890 | Gregg .......................... 474/62 |
| 2,296,740 | A | | 9/1942 | Reiling |
| 2,547,738 | A | * | 4/1951 | Bosworth .................... 56/11.6 |
| 2,620,612 | A | | 12/1952 | De Eugenio |
| 2,692,466 | A | * | 10/1954 | Brunts et al. ............... 56/320.1 |
| 2,705,393 | A | | 4/1955 | Cofer |
| 2,727,349 | A | | 12/1955 | Wetzel |
| 2,740,246 | A | | 4/1956 | Smith, et al. |
| 2,870,592 | A | * | 1/1959 | Swanson ..................... 56/13.6 |
| 2,872,831 | A | | 2/1959 | Wood |
| 2,989,134 | A | | 6/1961 | Kamlukin et al. |
| 3,498,398 | A | | 3/1970 | Burrough et al. |
| 3,680,292 | A | | 8/1972 | McCanse |
| 3,693,332 | A | | 9/1972 | Bobard |
| 3,698,497 | A | | 10/1972 | Bombardier |
| 3,709,062 | A | | 1/1973 | Draege |
| 3,757,596 | A | * | 9/1973 | McCanse ...................... 74/491 |
| 3,919,893 | A | * | 11/1975 | Boehm et al. ............... 474/134 |
| 3,925,970 | A | | 12/1975 | Rusco |
| 4,020,619 | A | * | 5/1977 | Massaro ...................... 56/11.2 |
| 4,102,114 | A | | 7/1978 | Estes et al. |
| 4,150,928 | A | | 4/1979 | Regan et al. |
| 4,187,924 | A | * | 2/1980 | Deschamps ................ 180/53.1 |
| 4,231,215 | A | * | 11/1980 | Klas ........................... 56/11.6 |
| 4,317,325 | A | * | 3/1982 | Marto ......................... 56/11.6 |
| 4,320,616 | A | * | 3/1982 | Marto ......................... 56/15.3 |
| 4,325,210 | A | * | 4/1982 | Marto ......................... 56/11.6 |
| 4,597,746 | A | | 7/1986 | Goscenski, Jr. |
| 4,773,895 | A | | 9/1988 | Takami et al. |
| 4,813,215 | A | | 3/1989 | Chase et al. |

(Continued)

*Primary Examiner*—Árpád Fábián-Kovács
(74) *Attorney, Agent, or Firm*—Robert O. Blinn (57) ABSTRACT

A lawn mower drive arrangement delivers power to a mower deck of a lawn mower vehicle. The drive arrangement includes a prime mover and a drive sheave, at least one mower deck sheave for powering at least one cutting blade and an endless engaging the drive sheave and at least one mower deck sheave. The drive sheave is oriented such that its axis of rotation is generally transverse. Guide pulleys engage the tension side and the slack side of the endless belt between the drive sheave and at least one mower deck sheave. The guide pulleys are positioned such that the endless belt twists by an acute angle substantially less than 60 degrees between the drive sheave and the guide pulleys.

7 Claims, 7 Drawing Sheets

U.S. PATENT DOCUMENTS

| | | | |
|---|---|---|---|
| 4,815,265 A * | 3/1989 | Guinn et al. | 56/297 |
| 4,925,437 A | 5/1990 | Suzuki et al. | |
| 5,012,632 A | 5/1991 | Kuhn et al. | |
| 5,249,411 A * | 10/1993 | Hake | 56/11.6 |
| 5,254,046 A | 10/1993 | Hohnl | |
| 5,361,566 A | 11/1994 | Hohnl | |
| 5,367,863 A | 11/1994 | Quataert | |
| 5,390,479 A | 2/1995 | Hutchison et al. | |
| 5,509,487 A * | 4/1996 | Dufty et al. | 172/21 |
| 5,526,635 A | 6/1996 | Wilder, Jr. | |
| 5,769,747 A | 6/1998 | Kuhn et al. | |
| 5,816,034 A | 10/1998 | Peter | |
| 5,865,020 A | 2/1999 | Busboom | |
| 5,928,097 A | 7/1999 | Mast | |
| 6,176,071 B1 | 1/2001 | Thorman et al. | |
| 6,312,352 B1 | 11/2001 | Holland et al. | |
| 6,389,786 B1 | 5/2002 | Bergsten et al. | |
| 6,591,592 B1 | 7/2003 | Krimminger | |
| 6,602,155 B2 | 8/2003 | Buss et al. | |
| 6,651,413 B2 | 11/2003 | Papke | |
| 6,931,825 B2 | 8/2005 | Stineman | |
| 6,952,913 B1 | 10/2005 | Crumly | |
| 7,028,456 B2 | 4/2006 | Thatcher | |
| 7,427,247 B2 * | 9/2008 | Melone | 474/62 |
| 2005/0230565 A1 | 10/2005 | Kallinen | |
| 2006/0025255 A1 | 2/2006 | Melone | |
| 2006/0230734 A1 | 10/2006 | Wouw | |
| 2007/0028577 A1 | 2/2007 | Clement et al. | |

* cited by examiner

BELT DRIVE FOR LAWN MOWERS

CROSS REFERENCES TO RELATED APPLICATIONS

This application claims the benefit of U.S. Provisional Patent Application No. 60/999,084 filed Oct. 16, 2007 which is incorporated herein by reference.

FIELD

This invention relates to a belt drive for lawn mowers.

BACKGROUND

This invention relates to an engine and belt drive arrangement for a mower vehicle and more particularly to the arrangement of a belt drive for transferring power from the engine to the mower deck of a riding lawn mower. A belt drive arrangement for communicating power between an engine and a mower deck is known by those skilled in the art as a "mule drive". A riding lawn mower may be considered in relation to an axis system including a longitudinal X axis where the positive direction is forward, a transverse Y axis where the positive direction is toward the operator's right and a Z axis where the positive direction is up. The X and Z axes define a vertical, longitudinal plane which generally bisects the riding lawn mower. Typically, a mule drive includes a drive sheave having an axis of rotation which is generally horizontal and co-planer with or at least parallel to the longitudinal plane of the mower vehicle. In a typical prior art mule drive, an endless belt communicates between the drive sheave and a mower deck. The mower deck typically has a driven sheave for each mower blade and various idler and tensioning pulleys as needed to maintain frictional engagement between the driven sheaves and the endless belt. A pair of guide pulleys situated under the drive sheave redirect the endless belt to the mower deck. The guide pulleys rotate on an axis which is normal or almost normal to the vertical, longitudinal plane of the mower vehicle. The orientation of the guide pulleys forces the endless belt to twist through an angle between the drive sheave and guide pulleys which is at or near 90 degrees. Typically, the guide pulleys are located as close as possible to the drive sheave so that the engine may be mounted as low as possible in the mower vehicle to maintain a relatively low center of gravity. Accordingly, the near 90 degree twist angle of the portions of the belt between the drive sheave and the guide pulleys must typically be accomplished over a relatively short distance. A rate of belt twist may be measured in angular degrees per unit length of belt. The rate of belt twist in a typical prior art mule drive may easily exceed 7 degrees per inch between the drive sheave and the guide pulleys. The rate of belt twist of the endless belt between the drive sheave and the guide pulleys limits the size and capacity of the belt as well as reducing the life of the belt.

The limitations inherent in a typical prior art mule drive configuration are three fold. First, in a traditional mule drive arrangement, an engine is positioned in a longitudinal fashion thereby increasing the length and decreasing the maneuverability of the mower vehicle. In a zero turning radius (ZTR) riding lawn mower, the longitudinal orientation of the engine also places the engine further to the rear of the center of rotation for the mower. Because of the need to prevent backward tipping of a ZTR mower about its primary drive wheels, the aft location of the engine forces the designer to position the counter balancing weight of the operator further forward of the center of turn rotation. However, in a ZTR mower, it is preferable to locate the operator close to the center of rotation for turning to reduce the centrifugal force experienced by the operator during tight turns or spin turns. This centrifugal force causes the operator to experience the unwanted sensation of riding at the end of a boom during a tight turn or spin turn. Second, the relative positions of the drive sheave and the guide pulleys are such that the area of the cross section of the belt (or more precisely the width and extent of the central load carrying fibers of the belt) and therefore the power transmission capacity of the belt are limited to allow a 90 degree twist between the drive sheave and a guide pulley. Third, even when the size of the endless belt is properly limited, an endless belt that undergoes repeated abrupt high angle twisting will withstand fewer cycles than a belt which is not subject to such repeated abrupt high angle twisting.

SUMMARY

A lawn mower drive arrangement is provided for delivering power from a prime mover such as, for example; an internal combustion engine or an electric motor to a mower deck of a lawn mower vehicle. The lawn mower vehicle may be considered as having a generally vertical longitudinal plane dividing its left side and the right side. The drive arrangement preferably includes an engine, a drive sheave connected to the engine preferably by a clutch, a mower deck having at least one mower blade drive sheave for powering each cutting blade associated with the mower deck, various idler pulleys, a tension pulley, an endless belt frictionally engaging the drive sheave and the mower blade drive sheaves and any other pulleys which may be associated with the mower deck. The improvement includes orienting the engine such that the axis of rotation of the drive sheave is preferably generally normal to the longitudinal plane of the lawn mower vehicle and positioning two guide pulleys to guide the slack side and the tension side of the endless belt between the drive sheave and the mower deck such that the axis of rotation of both guide pulleys preferably form acute angles with the longitudinal plane of the lawn mower. This causes the angles of twist between the drive sheave and the guide pulleys to be acute angles.

DETAILED DESCRIPTION

Figure 1A:
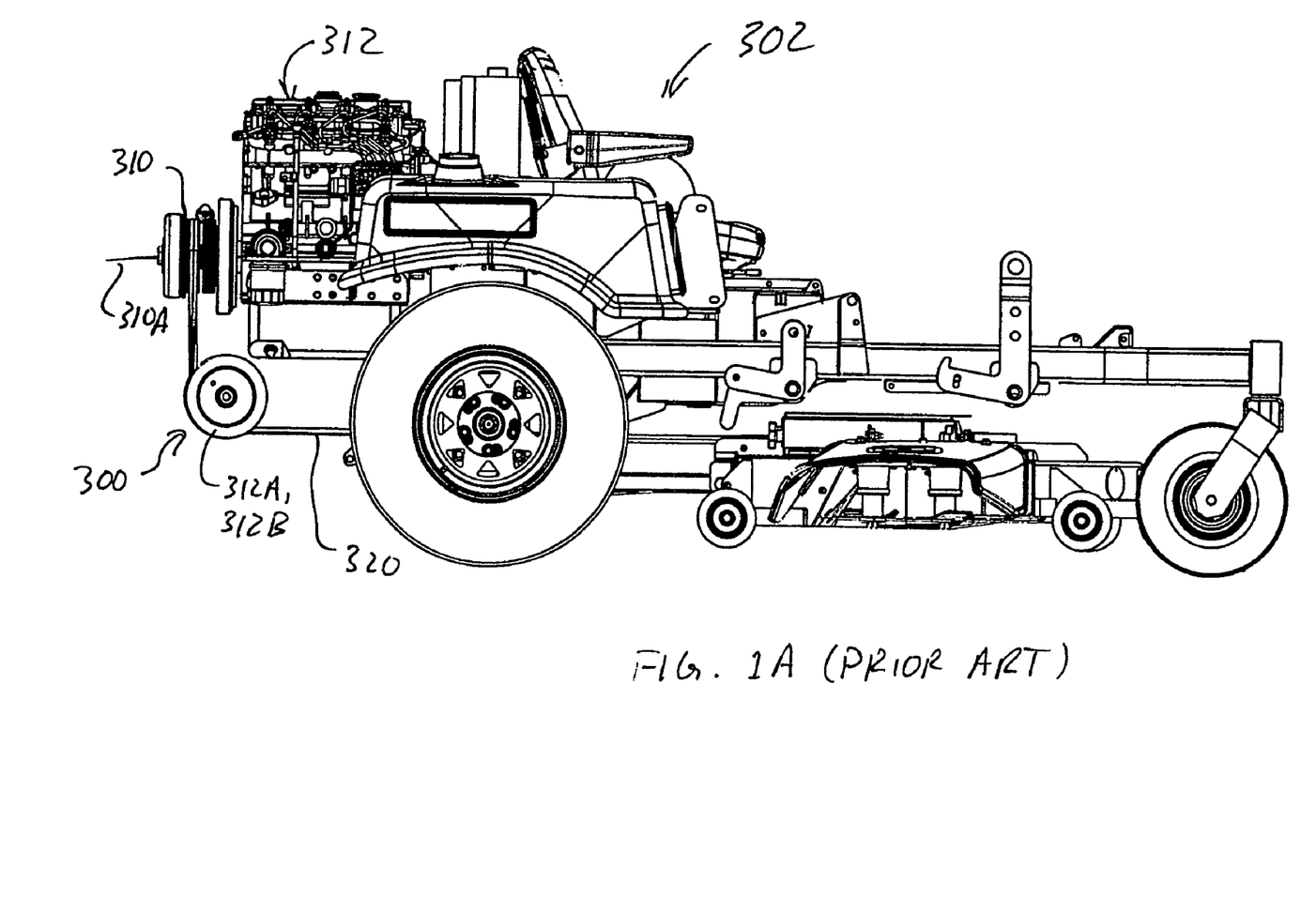
FIG. 1A is a side view of an example prior art mower having a prior art belt drive arrangement.
Figure 1B:
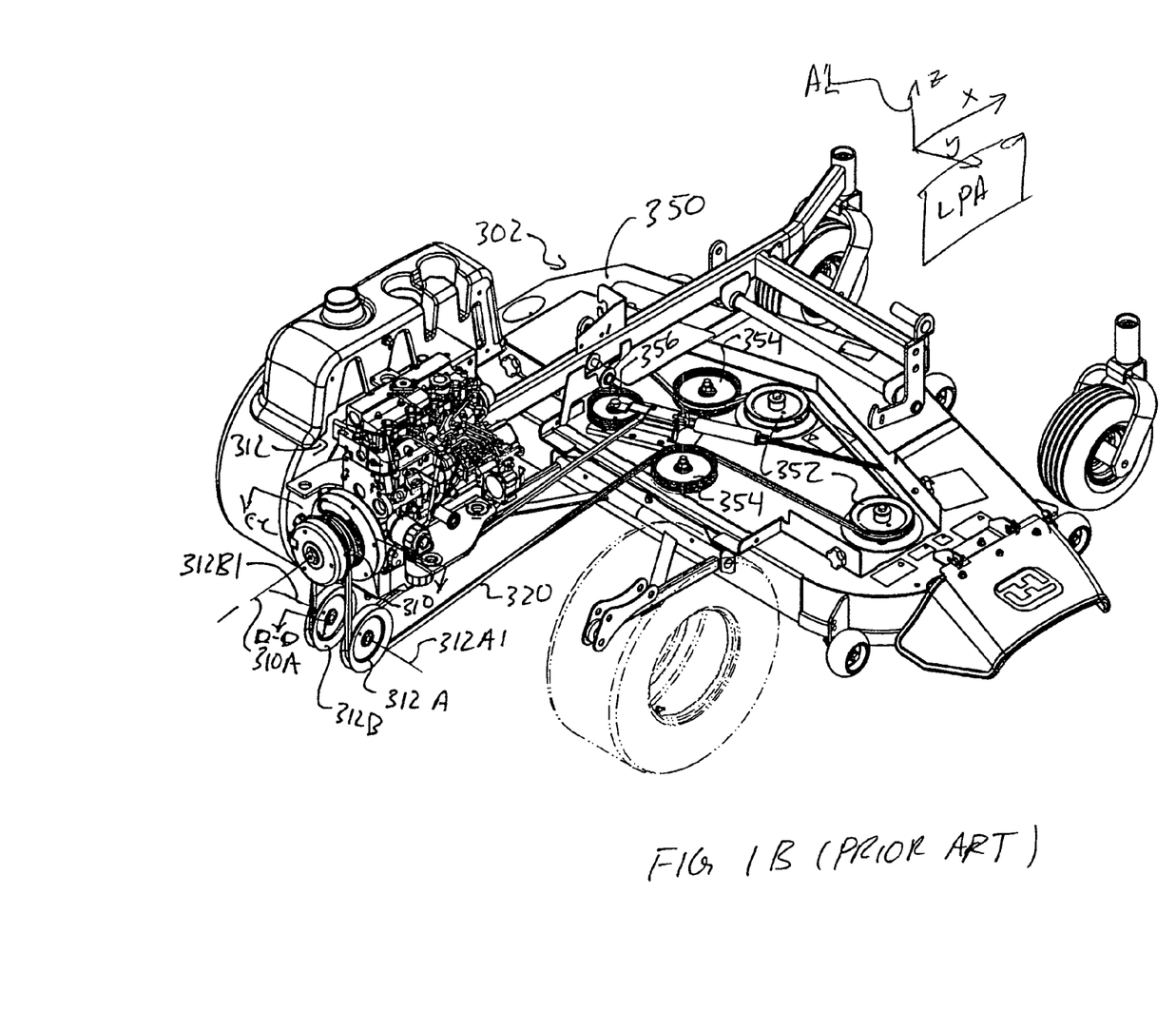
FIG. 1B is a perspective view of an example prior art belt drive arrangement for the lawn mower vehicle shown in FIG. 1A.
Figure 1C:
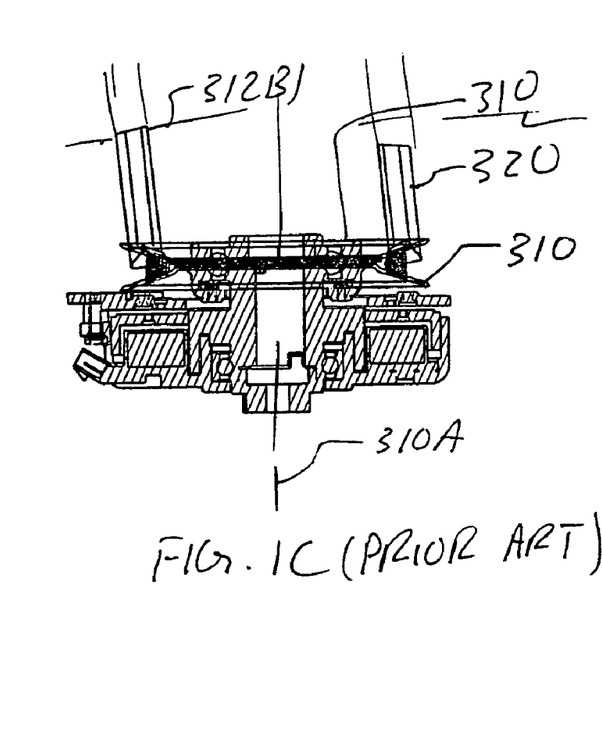
FIG. 1C is a partial top view of the example prior art belt drive arrangement of FIG. 1B showing the drive sheave.
Figure 1D:
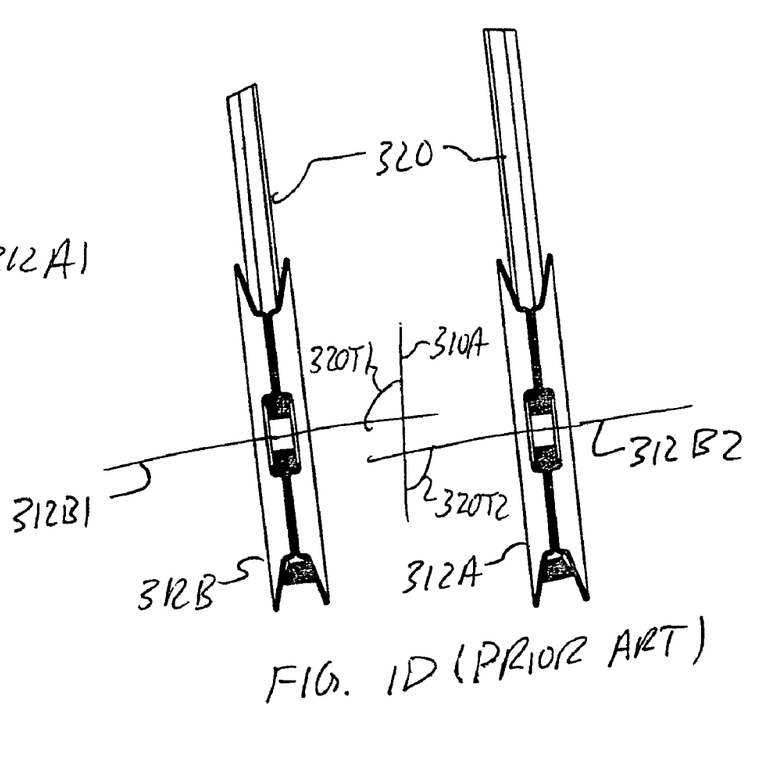
FIG. 1D is a partial top view of the example prior art belt drive arrangement of FIG. 1B showing the guide pulleys.

Referring to the drawings, FIGS. 1A and 1B illustrate a typical prior art mule drive arrangement 300 associated with a prior art lawn mower vehicle 302. Prior art mule drive arrangement shown in FIG. 1 includes a drive sheave 310 mounted to an engine 312, two guide pulleys 312A and 312B, an endless belt 320 and at least two mower deck pulleys 352 and 354 associated with a mower deck 350. Endless belt 320 frictionally engages drive sheave 310 and at least two mower deck pulleys 352 and 354. Endless belt 320 is typically one-sided as shown in FIGS. 1C and 1D. The axis of rotation 310A of drive sheave 310 is generally parallel to the X axis of axis system A1 shown in FIG. 1A. As can be seen by referring to FIGS. 1A and 1B, endless belt 320 twists through an angle of approximately 90 degrees as it passes between drive sheave 310 and guide pulleys 312A or 312B. As can be seen in FIG. 1C, which gives a top view of the drive sheave and guide pulley arrangement, this 90 degree angle of twist corresponds to the offset angle between axis 310A, the axis of rotation for guide pulleys 312A and 312B. As also can be best seen in FIG. 1A, engine 312 and drive sheave 310 project substantially behind the main wheels of mower vehicle 302.

In the prior art mule drive, the rate of belt twist between drive sheave 310 and each guide pulley 312A and 312B, which may be considered as angular degrees of twist per unit of distance, constrains the placement of drive sheave 310. As drive sheave 310 is positioned lower in the vehicle, the angle of twist per unit distance between drive sheave 310 and the guide pulleys increases. As the twist rate increases, the designer is confronted by a number of trade-offs. The designer may increase tension in the belt to prevent the belt from slipping off the guide pulleys, but this increase in tension may necessitate an increase in belt size. An increase in tension may also increase fatigue stresses in the belt. The designer may decrease the size of the belt to reduce its resistance to twisting, but this choice reduces the power transmission capability of the belt. The designer can elevate the engine and drive sheave to increase the distance between the drive sheave and the guide pulleys, but this will elevate the center of gravity of the mower vehicle.

FIGS. 2A-4D illustrate an example preferred embodiment of lawn mower drive arrangement 10. Lawn mower drive arrangement 10 is preferably adapted for powering the mower deck of lawn mower vehicle 2. Lawn mower drive arrangement 10 generally includes a drive sheave 20, a mower deck 50 having driven sheaves and pulleys, an endless belt 100 frictionally engaging drive sheave 20 and the driven sheaves and pulleys of mower deck 50, a tension side guide pulley 62 and a slack side guide pulley 72.

Lawn mower vehicle 2 may be considered as having a generally vertical longitudinal plane LP which is positioned between the left and right sides of lawn mower vehicle 2. An axis system A is given to orient the skilled reader in FIG. 2B.

Figure 2A:
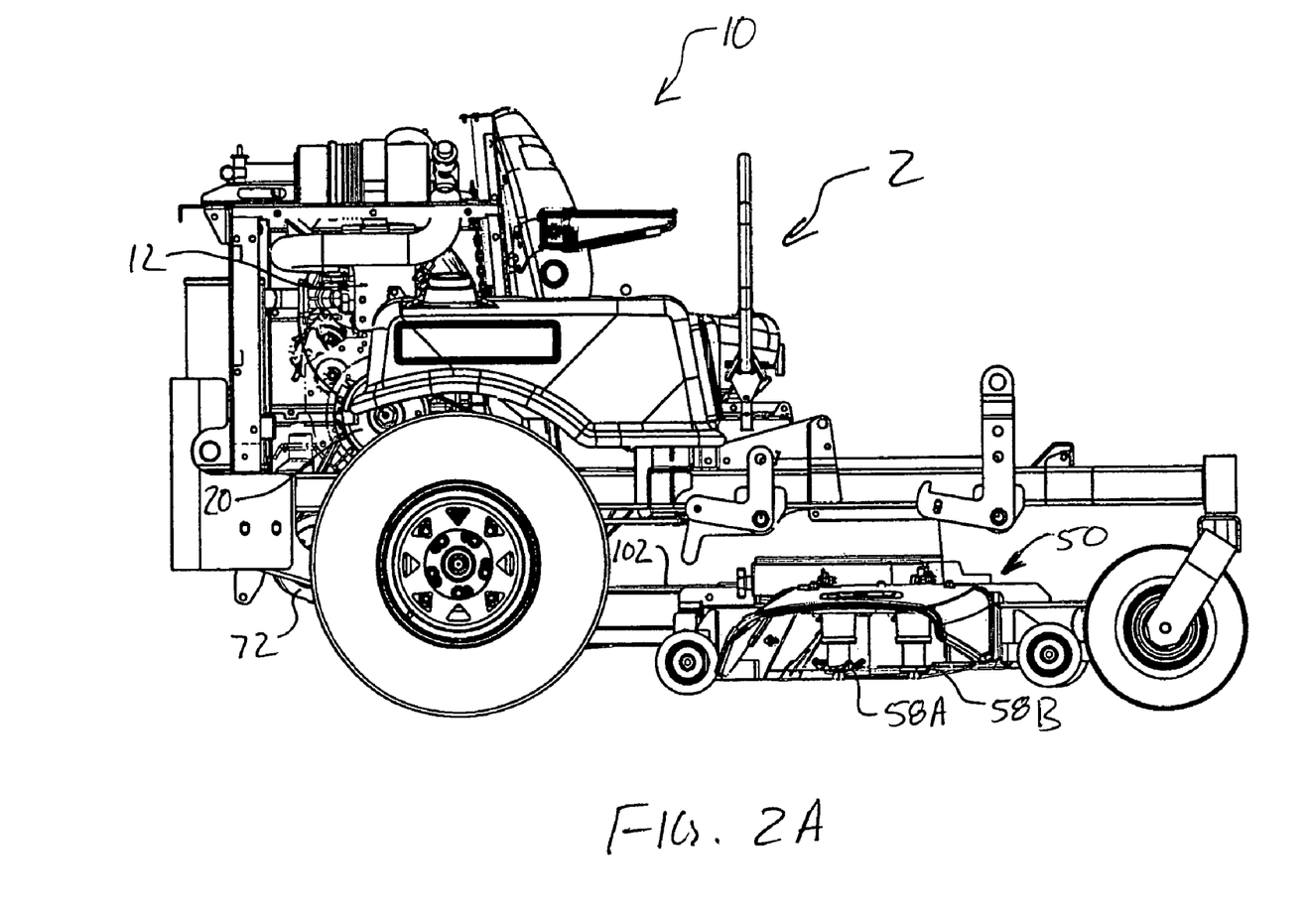
FIG. 2A is a side view of a mower having a belt drive arrangement of the present invention.
Figure 2B:
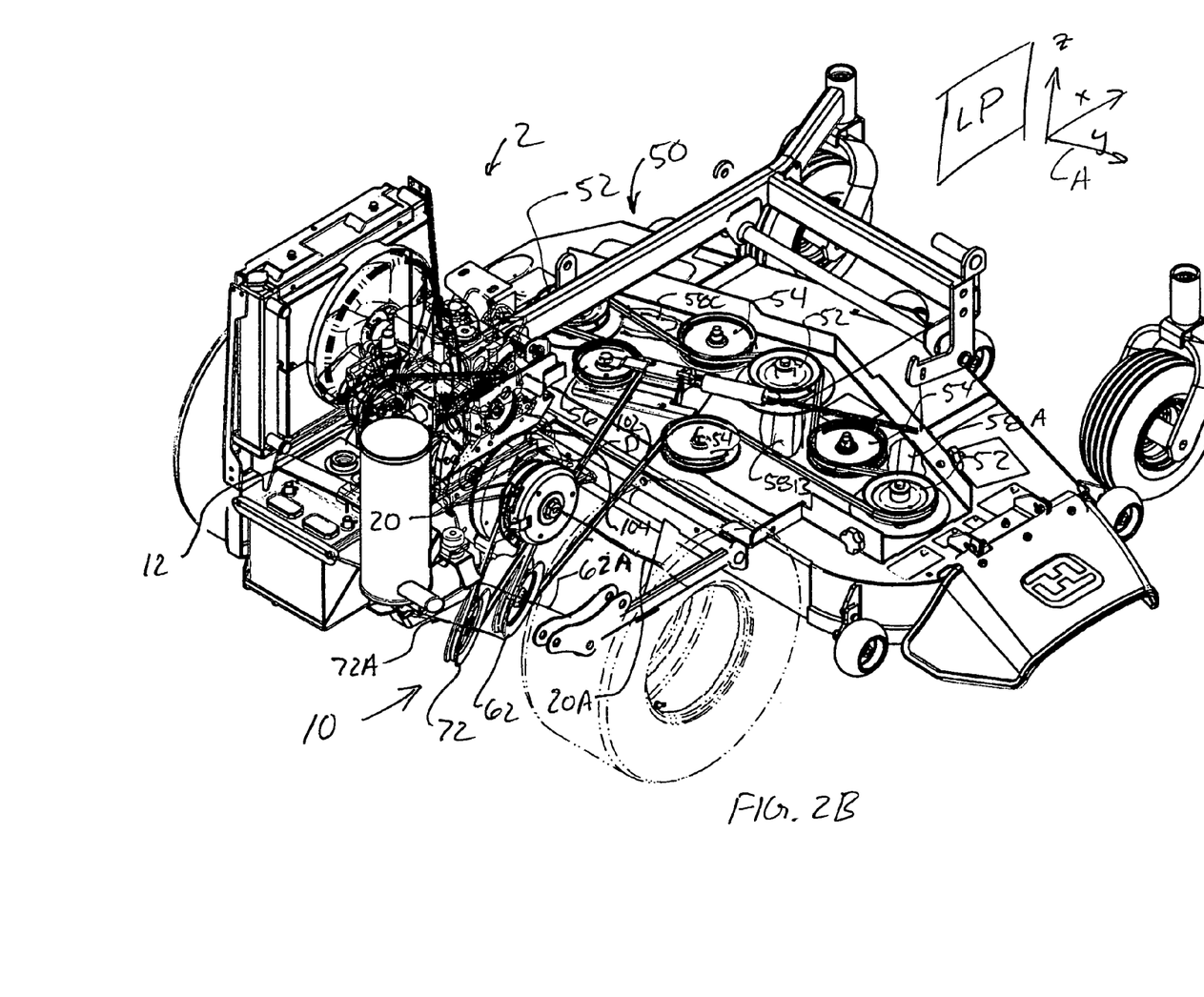
FIG. 2B is a perspective view of an example embodiment of the belt drive arrangement of the present invention.

Lawn mower drive arrangement 10 is mechanically associated with a prime mover, which in FIG. 2B is shown as an internal combustion engine 12. Engine 12 (or an electric motor which is not shown) powers a drive sheave 20. Preferably, as is well known by those skilled in the art, a clutch is interposed between the drive shaft of engine 12 and drive sheave 20.

Lawn mower vehicle 2, which is partially shown in phantom in FIG. 2B, includes mower deck 50. Mower deck 50 may be of a conventional design. A typical prior art mower deck is taught in U.S. Pat. No. 3,680,292 by McCanse. Accordingly, mower deck 50 is an example of a mower deck that may be powered by improved belt drive arrangement 10. Generally, a mower deck is a lawn mower vehicle structure that carries at least one driven sheave for powering a cutting device. A cutting device may be a blade as shown in FIG. 2B or may be a reel cutter or some other device for cutting vegetation or ground cover. In this example, mower deck 50 is shown to include a pattern of three blade drive sheaves 52, an idler pulley 54 and a tensioning pulley 56. As is typical, drive sheaves 52 are connected to three blades 58A, 58B and 58C which are partially exposed by broken areas of mower deck 50 in FIG. 2B.

An endless belt 100 engages drive sheave 20 and the blade drive sheaves 52 and pulleys 54 and 56 of mower deck 50 and thus transfers power from engine 12 to cutting blades 58A, 58B and 58C. The direction of rotation of drive sheave 20 is given by arrow D indicated in FIG. 2B. Endless belt 100 may be considered as having a tension side 102 which is being pulled by drive sheave 20 and an opposite slack side 104. Endless belt 100 may be of a generally conventional two-sided design as known by those skilled in the art. Tension side guide pulley 62 guides the tension side 102 of endless belt 100 from drive sheave 20 to mower deck 50. Slack side guide pulley 72 guides slack side 104 of endless belt 100 from drive sheave 20 to mower deck 50.

Endless belt 100 is shown in FIGS. 4A-4D as a two-sided belt. Those skilled in the art find that a two-sided belt as shown in FIGS. 4A-4D is preferable for engaging tension side guide pulley 62. A two-sided belt is preferable because it provides an opposite V shaped side for accomplishing a stable engagement with the correspondingly V shaped groove in tension side guide pulley 62. The skilled reader should understand that a single-sided belt as shown in FIGS. 1A-1D may be used for belt 100 or that any one of a number of suitable belt configurations may be used for an endless belt for practicing the invention.

Figure 3A:
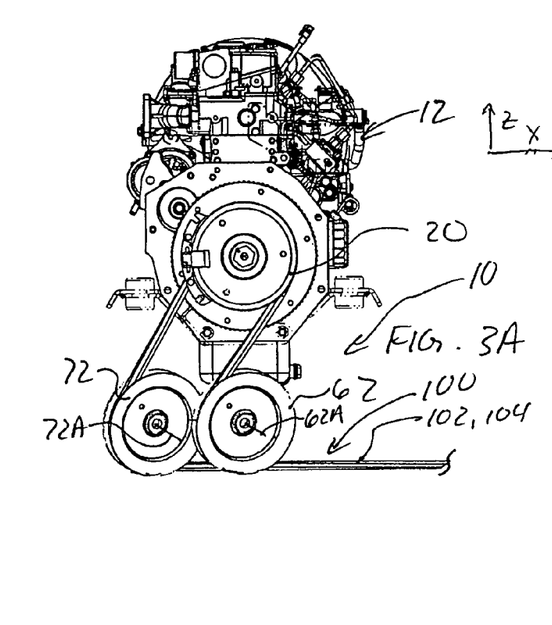
FIG. 3A is a side view of the belt drive arrangement of the present invention.
Figure 3B:
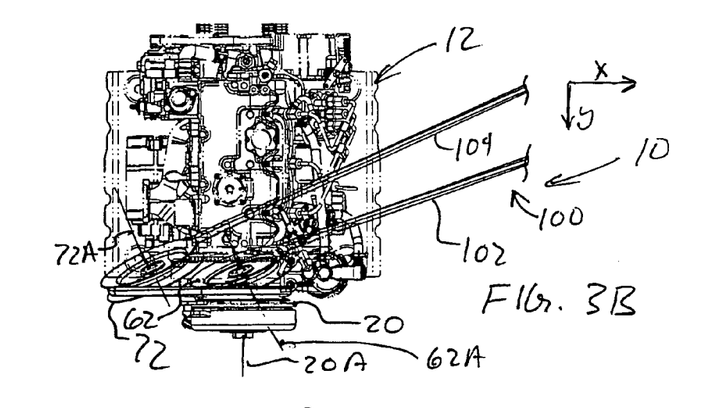
FIG. 3B is a top view of the belt drive arrangement of the present invention.
Figure 3C:
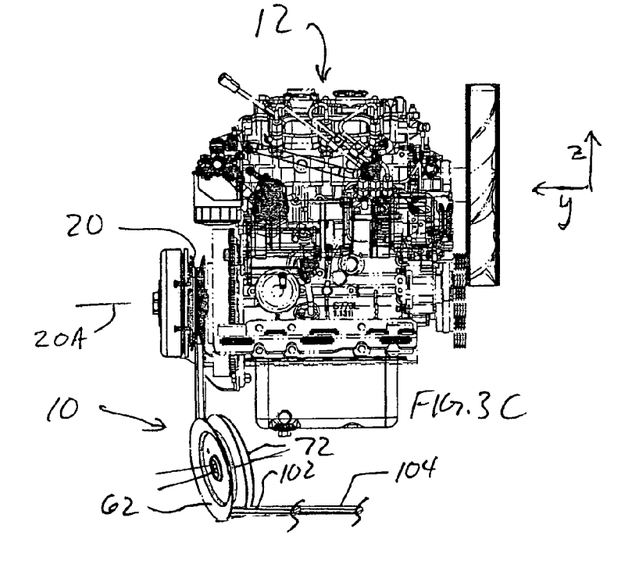
FIG. 3C is a front view of the belt drive arrangement of the present invention.
Figure 4A:
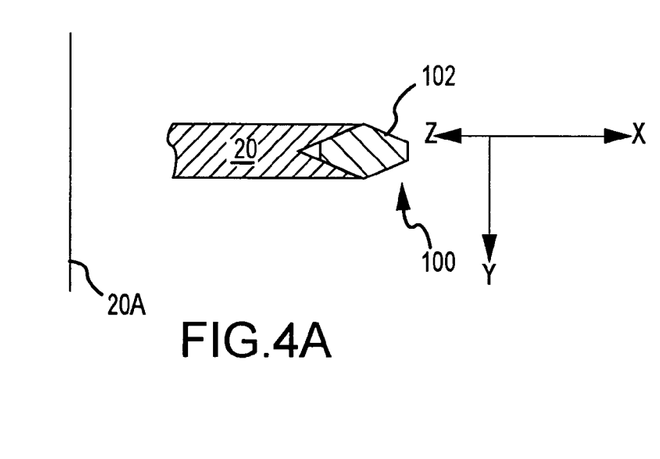
FIG. 4A is a magnified cross section view of the belt drive arrangement showing a cross section tension side 102 of belt 100 and a cross section of drive sheave 20 where belt 100 is received from guide pulley 62.
Figure 4B:
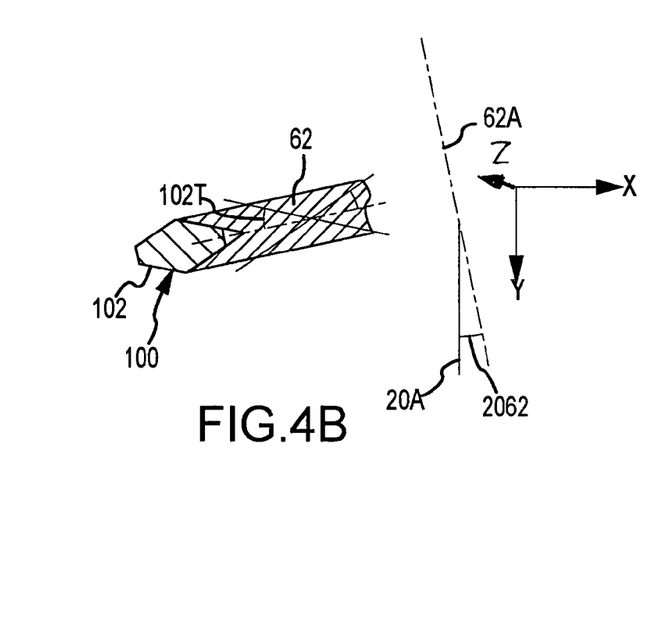
FIG. 4B is a magnified cross section view of the belt drive arrangement showing a cross section tension side 102 of belt 100 and a cross section of guide pulley 62 where belt 100 leaves guide pulley 62 for drive sheave 20.
Figure 4C:
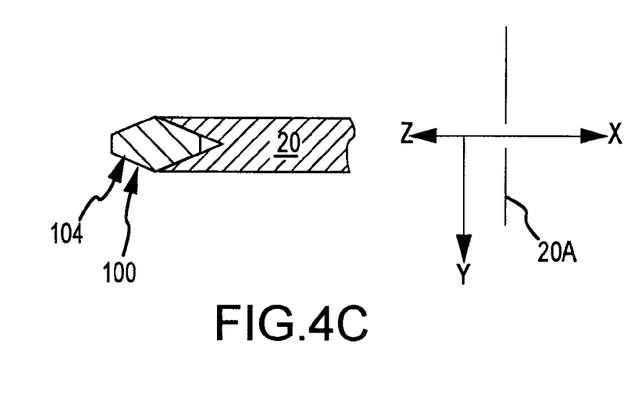
FIG. 4C is a magnified cross section view of the belt drive arrangement showing a cross section slack side 104 of belt 100 and a cross section of drive sheave 20 where belt 100 leaves drive sheave 20 for guide pulley 72.
Figure 4D:
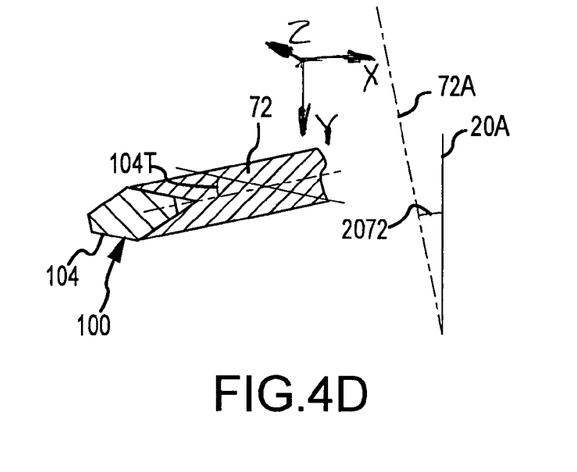
FIG. 4D is a magnified cross section view of the belt drive arrangement showing a cross section slack side 104 of belt 100 and a cross section of guide pulley 72 where belt 100 is received by guide pulley 72 from drive sheave 20.

The present belt drive arrangement is accomplished by the transverse orientation of engine 12 and the orientations of tension side guide pulley 62 and slack side guide pulley 72. As can be seen in FIG. 2B and FIGS. 3A-3C, engine 12 is oriented in a generally transverse fashion such that the axis of rotation 20A of drive sheave 20 is generally parallel to the X axis of axis system A. Tension side guide pulley 62 is preferably located such that its output side is aligned with the input side of drive sheave 20. As is shown in FIGS. 4A and 4B, tension side guide pulley 62 is oriented such that its axis of rotation 62A presents an acute angle 2062 with axis of rotation 20A of drive sheave 20. Slack side guide pulley 72 is preferably located such that its input side is aligned with the output side of drive sheave 20. As can be seen in FIG. 4D, slack side guide pulley 72 is also oriented such that its axis of rotation 72A presents an acute angle 2072 with axis of rotation 20A of drive sheave. The result of the relative orientations of drive sheave 20, tension side guide pulley 62 and slack side guide pulley 72 is that the angles by which belt 100 twists between drive sheave 20 and guide pulleys 62 and 72 are acute angles that are generally less than 60 degrees and preferably less than 45 degrees. Accordingly, as can be seen in this example in FIGS. 4A and 4B, the angle of twist 102T of tension side 102 of belt 100 between drive sheave 20 and tension side guide pulley 62 is an acute angle substantially less than 45 degrees. Similarly, as can be seen in this example in FIGS. 4C and 4D, the angle of twist 104T of slack side 104 of belt 100 between drive sheave 20 and slack side guide pulley 72 is an acute angle substantially less than 45 degrees. As can be seen by comparing FIG. 1D where the angles of twist is indicated as angle 320T1 and 320T2 for the prior art mule drive, and FIGS. 4B and 4D where angles of twist are indicated as angles 102T and 104T respectively for the improved belt drive, the angle of twist and the rate of belt twist have been reduced to fractions of the values found in prior art mule drives. It is preferable to minimize the angles of twist between drive sheave 20 and the guide pulleys 62 and 72 and for best, results, both of the angles of twist should be limited to an angle substantially less than 45 degrees. An angle of twist of approximately 30 degrees appears to be sufficient for minimizing the spacing between guide pulleys 62 and 72 and drive sheave 20. As noted above, minimizing this spacing allows engine 12 to be mounted as low as possible in mower vehicle 2 thereby minimizing the center of gravity of mower vehicle 2.

As can be best seen in FIGS. 3A-3C, guide pulleys 62 and 72 are not located directly below drive sheave 20. Guide pulleys 62 and 72, may, for example, be offset in a longitudinal direction as shown in FIG. 3A. Tension side guide pulley 62 should be positioned such that the tangent line defined by belt 100 as it leaves pulley 62 is co-linear with the tangent line defined by belt 100 as it is received by drive sheave 20. Similarly, slack side guide pulley 72 should be positioned such that the tangent line defined by belt 100 as it leaves drive sheave 20 is co-linear with the tangent line defined by belt 100 as it is received by pulley 72. The longitudinal offset between drive sheave 20 and guide pulleys 62 and 72 allows the designer to further minimize the vertical distance between drive sheave 20 and guide pulleys 62 and 72 and thus mount engine 12 as low as possible in mower vehicle 2.

There are at least four significant advantages afforded by improved belt drive arrangement 10. First, by orienting engine 12 transversely, the length of mower vehicle 2 can be reduced thereby increasing the maneuverability of mower vehicle 2. Engine 12 may be placed inside the turn radius of mower vehicle 2 in the case of a ZTR mower thereby greatly increasing the maneuverability of mower vehicle 2 and eliminating the possibility of an operator rotating the vehicle to cause an otherwise protruding engine to collide with an obstacle. The transverse mounting of engine 12 also allows for the location of engine 12 closer to the center of gravity of mower vehicle 2. In a ZTR mower, this allows the location of the engine closer to the center of rotation for turning. This further allows improvement in the position of the operator seat and thus the operator. Because the engine is positioned closer to the center of rotation, the counterbalancing operator may also be positioned closer to the center of rotation. This is an important consideration in a ZTR mower wherein it is very advantageous to position the operator close to the center of rotation of the mower vehicle. Second, due to the reduced angles of twist between the drive sheave and the guide pulleys, close vertical spacing of the drive sheave and the guide pulleys permits the engine to be mounted lower in mower vehicle 2 thereby allowing an advantageous lowering in the center of gravity of mower vehicle 2. Third, the transverse engine orientation makes it possible to offset the guide pulleys in a longitudinal direction relative the drive sheave. This allows a further reduction in the vertical distance between the drive sheave and the guide pulleys thereby allowing lower placement of the engine relative to mower vehicle 2. Third, the lower angle of twist and twist rate allows the use of a larger, heavier belt thereby increasing the power transmission capability of the belt. Fourth, the life of the belt is extended because the belt is subjected to less fatigue thereby reducing the expense and labor associated with replacing belts.

It is to be understood that while certain forms of this invention have been illustrated and described, it is not limited thereto, except in so far as such limitations are included in the following claims and allowable equivalents thereof.

What is claimed is:

1. A lawn mower drive arrangement for delivering power to a mower deck of a lawn mower vehicle having a generally vertical longitudinal plane positioned between the right side and the left side of the mower, the mower drive arrangement comprising:
    a prime mover,
    a drive sheave coupled to the prime mover having an axis of rotation generally normal to the vertical longitudinal plane of the mower vehicle,
    a mower deck sheave for powering a mowing blade,
    a belt communicating between the drive sheave and the mower deck sheave, the belt having a tension side and a slack side,
    a first guide pulley engaging the tension side of the belt between the drive sheave and the mower deck sheave and a second guide pulley engaging the slack side of the belt between the drive sheave and the mower deck sheave, the first and second guide pulleys positioned such that the belt twists by an angle substantially less than substantially 60 degrees between the drive sheave and each of the two guide pulleys.

2. A drive arrangement for delivering power to a mowing deck of a lawn mowing vehicle having a longitudinal axis, the drive arrangement comprising:
    an engine mounted transversely to the lawn mowing vehicle having a drive shaft that is generally horizontal and generally normal to the longitudinal axis of the lawn mowing vehicle,
    a drive sheave coupled to the engine drive shaft for powered rotation about an axis that is generally horizontal and generally normal to the longitudinal axis of the lawn mowing vehicle, the drive sheave having a tension side and a slack side,
    at least one mower deck sheave spaced away from the engine for powering the mowing deck, the mower deck sheave having a tension side and a slack side,
    a belt communicating between the drive sheave and the at least one mower deck sheave, the belt having a tension side and a slack side,
    a tension side guide pulley on the tension side of the belt between the drive sheave and the at least one mower deck sheave, the tension side guide pulley positioned such that the endless belt twists between the drive sheave and the first guide pulley by an angle less than about 60 degrees,
    a slack side guide pulley on the slack side of the endless belt between the drive sheave and the at least one mower deck sheave, the slack side guide pulley positioned such that the endless belt twists between the drive sheave and the slack side pulley by an angle less than about 60 degrees.

3. The drive arrangement of claim 2, wherein;
the tension side and slack side guide pulleys are positioned such that the belt twists between the drive sheave and the tension side and slack side guide pulleys by an angle that is less than 45 degrees.

4. The drive arrangement of claim 2, wherein;
the tension side and slack side guide pulleys are positioned such that the belt twists between the drive sheave and the tension side and slack side guide pulleys by an angle that is less than 35 degrees.

5. An improved belt drive arrangement for a mower vehicle having a longitudinal plane interposed between the right and left sides of the mower vehicle, the belt drive arrangement of the type including a belt having a tension side and a slack side for transferring power from a drive sheave coupled to a prime mover to a mower deck having at least one mower deck sheave for powering a cutting device, the improvement comprising:
the drive sheave oriented such that its axis of rotation is generally normal to the vertical longitudinal plane of the mower vehicle,
a tension side guide pulley for engaging the tension side of the endless belt between the at least one mower deck sheave and the drive sheave, the tension side guide pulley having an axis of rotation which defines an acute angle of substantially less than 60 degrees with a vertical plane containing the axis of rotation of the drive sheave such that the angle of twist of the endless belt between the tension side guide pulley and the drive sheave is an angle less than 60 degrees, and,
a slack side guide pulley for engaging the slack side of the endless belt between the drive sheave and the at least one driven sheave of the mower deck, the slack side guide pulley having an axis of rotation which defines an acute angles of substantially less than 60 degrees with a vertical plane containing the axis of rotation of the drive sheave such that the angle of twist of the endless belt between the drive sheave and the slack side guide is an angle less than 60 degrees.

6. The drive arrangement of claim 5, wherein;
the tension side and slack side guide pulleys are positioned such that the endless belt twists between the drive sheave and the tension side and slack side guide pulleys by an angle that is less than 45 degrees.

7. The drive arrangement of claim 5, wherein;
the tension side and slack side guide pulleys are positioned such that the endless belt twists between the drive sheave and the tension side and slack side guide pulleys by an angle that is less than 35 degrees.

* * * * *